(12) United States Patent
Kastell et al.

(10) Patent No.: US 10,005,207 B2
(45) Date of Patent: Jun. 26, 2018

(54) MOLDED PART AND METHOD FOR MANUFACTURING THE MOLDED PART

(75) Inventors: Friedhelm Kastell, Katzwinkel (DE); Peter Günther, Lampertheim (DE); Jochen Reichhold, Kassel (DE)

(73) Assignee: Faurecia Innenraum Systeme GmbH, Hagenbach (DE)

(*) Notice: Subject to any disclaimer, the term of this patent is extended or adjusted under 35 U.S.C. 154(b) by 0 days. days.

(21) Appl. No.: 14/131,335

(22) PCT Filed: Jul. 9, 2012

(86) PCT No.: PCT/EP2012/002892
§ 371 (c)(1),
(2), (4) Date: Feb. 14, 2014

(87) PCT Pub. No.: WO2013/004400
PCT Pub. Date: Jan. 10, 2013

(65) Prior Publication Data
US 2014/0342119 A1    Nov. 20, 2014

(30) Foreign Application Priority Data
Jul. 7, 2011   (DE) .................. 10 2011 106 883

(51) Int. Cl.
| | | |
|---|---|---|
| D06N 7/04 | (2006.01) | |
| D06N 7/06 | (2006.01) | |
| B32B 7/02 | (2006.01) | |
| B28B 11/08 | (2006.01) | |
| B29C 67/04 | (2017.01) | |
| B29C 43/18 | (2006.01) | |
| B29C 43/14 | (2006.01) | |
| B29C 43/20 | (2006.01) | |
| B29C 43/52 | (2006.01) | |
| B29K 23/00 | (2006.01) | |

(Continued)

(52) U.S. Cl.
CPC ............ B29C 43/18 (2013.01); B29C 43/146 (2013.01); B29C 43/183 (2013.01);
(Continued)

(58) Field of Classification Search
None
See application file for complete search history.

(56) References Cited

U.S. PATENT DOCUMENTS 3,141,809 A   7/1964  Di Maio et al.
4,034,137 A   7/1977  Hofer
(Continued)

FOREIGN PATENT DOCUMENTS

DE   2113740 A1   1/1972
DE   4214389 A1   11/1993
(Continued)

OTHER PUBLICATIONS

Database WPI, Week 201009,Thompson Scientific, London, GB; AN 2010-A87796, XP002688411, 2 pages.
(Continued)

*Primary Examiner* — David Sample
*Assistant Examiner* — Nicole T Gugliotta
(74) *Attorney, Agent, or Firm* — Reising Ethington P.C.

(57) ABSTRACT

The invention pertains to a molded part (10) with a visible surface and a rear surface (S1, S2), wherein the molded part (10) features:
 a substrate (20) of hot-pressed fibrous molding material (21);
 a coating (30) of at least one polymer material (34, 35);
wherein the surface (33) of the coating (30) has at least sectionally a center line average height Ra in the range of 10 to 80 μm,
as well as to a method for manufacturing the molded part.

19 Claims, 3 Drawing Sheets

(51) Int. Cl.
   *B29K 105/00* (2006.01)
   *B29L 31/30* (2006.01)
(52) U.S. Cl.
   CPC ............ B29C 43/203 (2013.01); *B29C 43/52* (2013.01); *B29C 2043/144* (2013.01); *B29K 2023/12* (2013.01); *B29K 2023/14* (2013.01); *B29K 2105/0085* (2013.01); *B29K 2105/253* (2013.01); *B29L 2031/30* (2013.01); *Y10T 428/24355* (2015.01)

(56) References Cited

U.S. PATENT DOCUMENTS

| | | | |
|---|---|---|---|
| 4,385,955 | A | 5/1983 | Doerfling et al. |
| 4,716,072 | A | 12/1987 | Kim |
| 5,817,402 | A | 10/1998 | Miyake et al. |

FOREIGN PATENT DOCUMENTS

| | | | | |
|---|---|---|---|---|
| DE | 102004045572 | A1 | 3/2006 | |
| DE | 10 2004 045572 | A1 * | 6/2006 | ............ B60R 13/02 |
| EP | 1593488 | A1 | 11/2005 | |
| EP | 1741567 | A1 | 1/2007 | |
| EP | 1815977 | A1 | 8/2007 | |
| GB | 1341438 | | 12/1973 | |
| JP | 08290511 | A | 11/1996 | |
| JP | 2010-012738 | A * | 1/2010 | ............ B29C 47/00 |
| JP | 2010012738 | A | 1/2010 | |
| WO | WO2010080967 | A1 | 7/2010 | |

OTHER PUBLICATIONS

International Search Report for application No. PCT/EP2012/002892, dated Mar. 1, 2013, 4 pages.

* cited by examiner

MOLDED PART AND METHOD FOR MANUFACTURING THE MOLDED PART

TECHNICAL FIELD

The present invention pertains to a molded part and to a method for manufacturing the molded part.

BACKGROUND

A multitude of molded parts are used in the interior of vehicles, for example door panels, roof linings, dashboards or instrument panels. The substrate of the molded part is made of plastic or preferably of a fibrous molding material, realized in a laminar fashion and has an essentially plane contour or a three-dimensional contour with convex and concave regions defined by the respective design, as well as, if applicable, one or more openings and recesses for trim strips and control elements such as pushbuttons, switches and rotary knobs for power windows and exterior rearview mirrors. In order to fix the molded parts in the passenger compartment or on the vehicle door and to mount handles, control elements and storage trays on the molded part, the molded part is also equipped with mounting parts that among experts are also referred to as retainers.

The substrate typically consists of plastics or composite materials that contain plastics such as acrylonitrile-butadiene-styrene (ABS) or polypropylene (PP). Fibrous molding materials on the basis of textile fabrics of hemp, sisal, flax, kenaf and/or wood components such as wood fibers, wood dust, wood chips or paper bound with duroplastic binders are likewise used as material for the substrate. Foamed materials of polyurethane or epoxy resins that, if applicable, are reinforced with natural fibers or glass fibers may also be considered as material for the substrate.

The side of the respective molded part or substrate that faces the vehicle interior is usually referred to as the visible side. In order to provide the visible side with an attractive appearance, the substrate is equipped with one or more decorative elements of a textile material or a plastic film. The plastic films used for this purpose are usually colored and have a relief-like embossed surface. If applicable, the decorative elements comprise a cushioning layer of a foamed plastic that faces the substrate and provides the molded part with pleasantly soft haptics. The decorative elements are usually laminated onto the substrate or bonded thereto during the manufacture of the substrate by means of thermoplastic back-injection molding.

On its edge and/or on an installation side that lies opposite of the visible side, the substrate is advantageously equipped with projections, depressions and bores. The projections, depressions and bores serve for non-positively connecting the molded part to sections of the car body such as a car door or the roof of a passenger compartment by means of retaining elements such as clips, pins and screws.

The respective mounting parts or retainers are made of plastic or a metallic material such as sheet steel and mechanically connected to the substrate by means of retaining elements such as pins, screws or clips or by means of interlacing, clawing or clamping. Retainers advantageously comprise claws and/or clips as integral components. The claws and clips are respectively provided for engaging into recesses of the substrate or for being bent around the edge of the substrate, as well as for being fixed by means of clamping, during the installation of the retainers.

Different methods that typically comprise two or more production steps are known for the manufacture of molded parts for the interior trim of vehicles.

According to one known method, a substrate is initially produced of a fibrous molding material by means of hot-pressing. Subsequently, retainers are attached to the installation side of the substrate, e.g., by means of friction welding or bonding. In a third step, one or more decorative elements are laminated onto the visible side of the substrate. In a simplified two-step variation of the method, retainers of a metallic material with integrated retaining elements, particularly with claws, are compressed together with the fibrous molding material, wherein the retaining elements penetrate into the fibrous molding material and non-positively anchor the retainers on the substrate after the fibrous molding material has cured.

According to another known method, a substrate is manufactured of a thermoplastic by means of injection molding, particularly by means of back-injection molding. One or more decorative elements are preferably arranged in a back-injection mold and back-injected with the thermally plasticized plastic. After the molten plastic has cooled and solidified, the decorative elements are non-positively bonded to the substrate. In another step, mounting parts or retainers are respectively mounted on the installation side of the substrate.

Substrates of fibrous molding material are utilized for the interior trim of vehicles to a continuously increasing extent. Fibrous molding materials have a few advantages over plastics. For example, a considerable portion of fibrous molding materials is produced of renewable resources such as conifers, hemp or kenaf. Technical and economical considerations also fuel the trend toward fibrous molding materials. At the same specific rigidity, fibrous molding materials have a lower weight than glass fiber-polypropylene composites or talcum-polypropylene composites. Substrates of fibrous molding materials are distinguished by their favorable crash and splintering characteristics, their sound energy and acoustic absorption (also at cold temperatures) and a comparatively low coefficient of thermal expansion. The industry has many years of experience with the processing of fibrous molding materials, wherein the corresponding processes and hot-pressing molds are respectively robust and cost-efficient in comparison with injection molds. Fibrous molding materials allow the manufacture of substrates with highly pronounced undercuts and changes in direction with an angle of up to 180 degrees. Furthermore, wood fibers and natural fibers are available in large quantities, wherein their prize is also less dependent on the price of crude oil than petroleum-based plastics.

One example of a surface texture is disclosed in WO 2010/080967 A1, according to which an interior trim panel of fibrous molding material is equipped with a smooth, transparent, liquid-impermeable, scratch-resistant and UV-resistant coating of a material, preferably a thermoplastic polymer, with a melting point in the range of 60 to 170° C. The coating is applied by means of hot-pressing, wherein the material of the coating partially sinks into the fibrous molding material such that the coating is non-positively connected to the fibrous molding material.

SUMMARY

It is an objective of the invention to make available a molded part and, in particular, a trim panel that has or produces wood-like haptics on its surface on the visible side, and that is suitable for a high-quality visual appearance of the surface and durable.

It also is an objective of the invention to make available an efficient method for manufacturing such a molded part.

These objectives are attained with the respective independent claims. Other embodiments are disclosed in the dependent claims that respectively refer to these independent claims.

The inventive molded part may consist, in particular of a trim panel with a surface on the visible side that faces an interior. The molded part is intended for being attached to a frame component, wherein the molded part or trim panel has a rear side that lies opposite of the surface on the visible side and, when installed as intended, faces the frame component while the surface on the visible side faces the interior of the vehicle.

The molded part may consist, in particular, of an interior trim panel such as a door trim panel or an instrument panel or a dashboard. These components are intended for being attached to a frame component of the vehicle. The molded part according to the invention provides special haptics, i.e., the effect of a special tactile perception when the surface is touched. In contrast to visual and acoustical perception, only little research on human haptics has been carried out so far. The biomechanical and neurological processes, on which haptic perception is based, are extremely complex and only understood to a small extent. Fine surface textures cannot be perceived by being touched with static pressure of the fingertips. In fact, this is only possible by means of a dynamic inspection, in which the fingertips move over the surface and the skin of the fingertips is mechanically deformed in a complex fashion dependent on the time. The dynamic skin deformations are converted into time-variant (transient) signals by the nerve cells that are embedded in the epidermis and the dermis, wherein these signals reach the central nervous system via the corresponding nerve pathways and are then analyzed. The surface texture is classified by the central nervous system based on this analysis of the transient signals. Lamotte and Whitehouse have investigated human haptics and found in their experiments that the detection threshold for superficial height differences amounts to approximately 1 μm referred to a point with a diameter of 600 μm that is arranged on a smooth surface. In order to perceive a point with a diameter of 40 μm, the height of the point would have to mount to at least 6 μm. Further experiments showed that human subjects were capable of perceiving points with a height of 3 μm if the fingertips moved over the surface with a speed of approximately 10 mm/s. According to a first aspect, the invention proposes a molded part that features or comprises a substrate of fibrous molding material and a coating of at least one polymer material or polymer materials, wherein the surface of the coating has at least sectionally a center line average height Ra in the range of 10 to 80 μm.

The substrate or the substrate layer may be formed or consist, in particular, of hot-pressed fibrous molding material.

According to a special embodiment of the inventive molded part, it is proposed that the surface of the coating has at least sectionally a center line average height Ra in the range of 20 to 80 μm.

According to an embodiment of the inventive molded part, it is proposed that the coating features a first, superficial coating zone and a second, non-positively connecting coating zone. The coating may consist of one or more layers.

According to an embodiment of the inventive molded part, it is proposed that the center line average height Ra lies in the range of 10 to 50 μm or in the range of 20 to 40 μm.

According to an embodiment of the inventive molded part, it is proposed that
 the coating features or comprises a first, superficial coating zone and a second, non-positively connecting coating zone;
 the first coating zone contains at least one of the polymer materials or consist of at least one of the polymer materials and has a thickness in the range of 10 to 200 μm or in the range of 10 to 60 μm or in the range of 10 to 30 μm;
 the second coating zone contains at least one of the polymer materials or consists of at least one of the polymer materials and fibrous molding material and has a thickness in the range of 10 to 200 μm or in the range of 20 to 100 μm or in the range of 20 to 50 μm.

Due to the thicknesses of the two coating zones, this molded part on the one hand makes it possible to realize the surface of the first coating zone that simultaneously forms the surface of the coating with a topography that essentially conforms to the surface of the fibrous molding material. This topography is essentially defined by the shape and the more or less random arrangement of the fibers of the fibrous molding material and has the inventive roughness such that this surface is similar to wood and imparts the desired wood-like haptics. In addition, the first coating zone acts as a seal that respectively protects the fibrous molding material and the molded part from damaging effects such as scratches or liquids. This advantageous topography can be surprisingly achieved with pressing tools that have no corresponding wood-like grain or the like on their pressing surfaces that come in contact with the surface of the coating.

Due to the thickness of the second coating zone, this molded part on the other hand makes it possible for at least one of the polymer materials in the second coating zone to penetrate into the fibrous molding material such that this second coating zone ensures a permanent non-positive anchoring of the coating on the fibrous molding material.

According to an embodiment of the inventive molded part, it is proposed that:
 a first polymer material contains a thermoplastic matrix polymer with a first melting point;
 a second polymer material contains a thermoplastic matrix polymer with a second melting point;
 the first melting point is higher than the second melting point by more than 5° C. or by more than 10° C. or by more than 20° C. or by more than 30° C.

According to an embodiment of the inventive molded part, it is proposed that
 the substrate is coated with a film that features a first film layer of the first polymer material and a second film layer of the second polymer material;
 the second film layer faces the substrate.

According to an embodiment of the inventive molded part, it is proposed that the substrate is coated with a film of at least one of the polymer materials that comprises at least one layer and has an overall thickness in the range of 40 to 1000 μm or in the range of 60 to 200 μm or in the range of 80 to 120 μm.

According to an embodiment of the inventive molded part, it is proposed that
 each polymer material or the at least one polymer material of the coating contains a matrix polymer and, if applicable, additives such as color pigments and UV stabilizers or consists of a matrix polymer and, if applicable, of additives such as color pigments and UV stabilizers; the matrix polymer is chosen from polyolefins, polyester, polypropylene, polyamide or mixtures thereof and the proportion of additives referred to the polymer material amounts to 0 to 15 wt. %.

According to an embodiment of the inventive molded part, it is proposed that the fibrous molding material features synthetic fibers and/or natural fibers.

According to an embodiment of the inventive molded part, it is proposed that the molded part additionally features at least one mounting part of plastic and/or a metallic material such as sheet steel that is non-positively connected to the substrate, wherein particularly the mounting parts are connected to the substrate by means of retaining elements such as pins, screws or clips or by means of interlacing, clawing or clamping or by means of adhesives.

According to an embodiment of the inventive molded part, it is proposed that the topography of the surface essentially conforms to the surface of the fibrous molding material.

According to an embodiment of the inventive molded part, it is proposed that the topography of the surface is essentially defined by the shape and the more or less random arrangement of the fibers of the fibrous molding material.

According to an embodiment of the inventive molded part, it is proposed that the surface is similar to wood and/or has wood-like haptics.

Advantageous enhancements of at least some embodiments of the inventive molded part are characterized in that:
the surface of the coating has a topography with a center line average height Ra in the range of 10 to 50 μm, preferably 20 to 40 μm;
the coating comprises a first, superficial coating zone and a second, non-positively connecting coating zone, wherein the first coating zone consists of one or more polymer materials and has a thickness D1 of 10 to 200 μm, preferably 10 to 60 μm, particularly 10 to 30 μm, and the second coating zone consists of one or more polymer materials and fibrous molding material and has a thickness D2 of 10 to 200 μm, preferably 20 to 100 μm, particularly 20 to 50 μm;
the substrate is coated with a single-layer, two-layer or multi-layer film of one or more polymer materials with an overall thickness of 40 to 1000 μm, preferably 60 to 200 μm, particularly 80 to 120 μm;
the at least one polymer material of the coating consists of a matrix polymer and, if applicable, of additives such as color pigments and UV stabilizers, wherein the matrix polymer is chosen from polyolefins, polyester, polypropylene, polyamide or mixtures thereof and the proportion of additives referred to the polymer material amounts to 0 to 15 wt. %;
the fibrous molding material contains synthetic fibers, particularly carbon fibers, fibers of polyester, acrylic, aramide, Twaron, Kevlar, Technora, Vinalon, Zylon and/or polypropylene;
the fibrous molding material respectively contains referred to its overall weight 30 to 70 wt. % natural fibers, 70 to 30 wt. % fibers of one or more thermoplastic polymers, particularly fibers of polypropylene, and, if applicable, additives such as fillers, dyes, UV stabilizers and/or synthetic fibers, wherein the proportion of the optional additives amounts to 0.5 to 15 wt. %;
the fibrous molding material comprises natural fibers, particularly fibers of wood, kenaf, jute, flax, ramie (*Boehmeria nivea*), rattan, soya, okra (*Abelmoschus esculentes*), banana, bamboo, coconut, coir, cotton, curaua (*Ananas lucidus*), abaca (*Musa textilis*), pine, pineapple, raffia palm (*Raphia farinifera*) and/or sisal;
the molded part comprises one or more mounting parts of plastic that are non-positively connected to the substrate; and/or
the mounting parts are connected to the substrate by means of retaining elements such as pins, screws or clips or by means of interlacing, clawing or clamping or by means of adhesives.

According to an alternative embodiment of the inventive molded part, it is proposed that the fibrous molding material respectively comprises referred to its overall weight 60 to 80 wt. % natural fibers, 15 to 30 wt. % synthetic fibers and 5 to 15 wt. % thermoplastic or duroplastic binder, wherein the binder preferably comprises acrylates.

The substrate of the molded part has a thickness of 1.5 to 4.0 mm, preferably 1.8 to 3.0 mm.

The respective topography or roughness of the surface of the inventively coated molded part is determined by means of a tactile profilometer such as, for example, an instrument of the type "Hommel-Etamic T8000 R" by Jenoptik or "Surftest SV-3100" by Mitutoyo.

The measurement is carried out in accordance with standards DIN EN ISO 4287:1998 and DIN EN ISO 11562:1998. In this case, a stylus with a radius of less than 5 μm is used. During each roughness measurement, a probing section Lt of more than 15 mm including approach and follow-up section is examined. A value of $\lambda C=2.5$ mm is used for the cut-off $\lambda C$ of the low-pass filter for the separation of roughness and waviness according to DIN EN ISO 1562:1998; the length of the individual measuring sections lr therefore also has the value lr=2.5 mm (lr=$\lambda C$).

In the context of the invention, the term fibrous molding material refers to a textile fabric, i.e. particularly a woven fabric, a knitted fabric or a nonwoven fabric, that comprises fibers, shavings, chips or mixtures thereof. One example of a fibrous molding material are wet-laid or air-laid and carded nonwoven fabrics. The nonwoven fabrics may contain natural or synthetic fibers or mixtures of natural and synthetic fibers, as well as chips or shavings of wood. For example, fruit fibers, seed fibers and stalk fibers such as sisal, jute, hemp, kenaf, flax, cellulose and cotton, as well as banana fibers and wool, may be considered as natural fibers. Furthermore, synthetic fibers of polyester, polyacrylonitrile, polyamide, carbon, polyvinyl chloride, polyolefins such as polyethylene and polypropylene, as well as inorganic materials such as aramide and glass, are proposed.

In an advantageous embodiment of the invention, the fibrous molding material respectively comprises referred to its overall weight 30 to 70 wt. % natural fibers, 70 to 30 wt. % fibers of one or more thermoplastic polymers, particularly fibers of polypropylene and/or propylene copolymers, and, if applicable, additives such as binders, fillers and/or dyes, wherein the proportion of the optional additives amounts to 0.5 to 15 wt. % referred to the overall weight of the fibrous molding material. In this embodiment, the fibers of one or more thermoplastic polymers serve as a binder that plasticizes during the hot-pressing of the fibrous molding material and then solidifies as it cools such that the natural fibers are respectively bonded to one another and form a solid matrix, in which the natural fibers are embedded. It is preferred that the fibrous molding material respectively comprises referred to its overall weight 40 to 60 wt. % natural fibers and 60 to 40 wt. % fibers of one or more thermoplastic polymers. The fibrous molding material is produced in a process similar to that described above, wherein the natural fibers and the fibers of one or more thermoplastic polymers are initially blended and, if applicable, placed onto a thin nonwoven support and transport fabric. The blending of the fibers preferably takes place in a turbulent air current or in a swirling apparatus, respectively. Subsequently, the blended fibers are mechanically compacted, aligned, if applicable, and cut to size by means of a cutting device. In an advantageous enhancement of the above-described embodiment of the invention, the fibrous molding material contains additional synthetic fibers, particularly carbon fibers, fibers of polyester, acrylic, aramide, Twaron, Kevlar, Technora, Vinalon or Zylon in addition to natural fibers and fibers of one or more thermoplastic polymers.

In the context of the present invention, the term "polymers" includes homopolymers, as well as copolymers, of the cited polymer types.

The mat-like fibrous molding materials has a thickness of 5 to 30 mm, preferably 10 to 20 mm, and a grammage of 80 to 4000 g/m², preferably 500 to 2500 g/m², particularly 1200 to 2200 g/m².

The inventive molded part advantageously also may comprise respective mounting parts or retainers. The mounting parts are manufactured of a polymer material, preferably of a thermoplastic with a softening point of 140 to 180° C. It is proposed, in particular, to utilize materials such as polypropylene (referred to as PP below), acrylonitrile-butadiene-styrene (referred to as ABS below), as well as blends of acrylonitrile-butadiene-styrene and polycarbonate (referred to as PC below), for the mounting parts.

The inventive molded parts may furthermore comprise one or more textile decorative elements. The decorative elements are realized in the form of a flat, textile-like mat and comprise at least one decorative layer that is referred to as visible layer below and, if applicable, other functional layers, particularly a cushioning layer and/or a layer of a second hot-melt adhesive.

The visible layer preferably consists of a knitted fabric or woven fabric of natural or synthetic fibers or blends thereof. The visible layer may be realized, in particular, in the form of a layer of carpet, velour, a printed film, a film of thermoplastic polyolefins (TPO film), a polyvinyl chloride film (PVC film), a polyester film (PET film), leather or synthetic leather. The visible layer particularly consists of a fibrous nonwoven fabric of polypropylene (PP) or a blend of polypropylene and polyethersulfone (PES). Any polymers used for the visible layer are chosen from the group comprising polyester, polyethylene, polyterephthalate, polyacetate, polyolefins such as polypropylene or polyvinyl chloride or copolymers of the aforementioned materials.

The optional cushioning layer is manufactured of an elastic material that is preferably chosen from the group comprising natural and synthetic elastomers, foamed polymers, nonwoven fabrics of natural or synthetic fibers or mixtures thereof, as well as knitted spacer fabrics of synthetic filaments.

In another embodiment, the decorative element also comprises an insulating layer that is arranged adjacent to the cushioning layer and opposite of the visible layer. The insulating layer has the function of protecting the material of the cushioning layer from thermal damages during the hot-pressing of the fibrous molding material. The insulating layer is preferably manufactured of a nonwoven fabric that consists of natural or synthetic fibers or blends thereof.

The visible layer, the optional cushioning layer and the optional insulating layer are advantageously connected to one another at selective points, linearly or over the entire surface by means of bonding, sewing or laminating.

In advantageous enhancements of the invention, the mounting parts and the decorative elements respectively are non-positively connected to the substrate by means of a first hot-melt adhesive and by means of a second hot-melt adhesive, wherein the first and the second hot-melt adhesive may differ from one another. Hot-melt adhesives are based on thermoplastic polymers. During their respective utilization or application, they need to be heated to a temperature in the range of approximately 50° C. above the softening point of the thermoplastic base polymer. This heating process reduces the viscosity of the thermoplastic base polymer in such a way that it wets the surfaces to be bonded to one another and, if applicable, penetrates into pores and depressions in these surfaces.

The thermoplastic base polymers for the first and second hot-melt adhesive are chosen, in particular, from the following list:

| Thermoplastic base polymer | Application temperature/softening point |
|---|---|
| Polyethylene (PE) | 140 to 200° C. |
| Amorphous polyalphaolfins (APAO) | around 170° C. |
| Ethylene vinyl acetate copolymers (EVAC) | around 150° C. |
| Polyester elastomers (TPE-E) | 65 to 150° C. |
| Copolyamide elastomers (TPA-E) | around 130° C. |
| Vinyl pyrrolidone/vinyl acetate copolymers (water-soluble) | around 130° C. |

The first and the second hot-melt adhesive may independently of one another contain one or more of the aforementioned base polymers.

In advantageous embodiments of the invention, the first and/or the second hot-melt adhesive is/are realized in the form of a reactive hot-melt adhesive. The reactive hot-melt adhesives proposed in accordance with the invention are preferably based on polyurethanes that are provided with isocyanate groups. The isocyanate groups cause a cross linkage of the polyurethane molecular chains under the influence of atmospheric humidity and, in particular, water vapor that is created during the hot-pressing of the fibrous molding material due to the residual moisture of the natural fibers. Since the cross-linkage of the polyurethane molecular chains is not separated by another heating process, reactive hot-melt adhesives on the basis of polyurethane are also referred to as duroplastic hot-melt adhesives.

According to another aspect of the invention, a method for manufacturing a molded part is proposed, wherein said method features the steps of:

applying the polymer materials (34, 35) onto at least one surface of the fibrous molding material (50) in the form of dispersions, powders, granulates or a film (40) that consists of at least one layer;

compressing the fibrous molding material (50) and the polymer materials (34,35) into a blank (90) with a first temperature-controlled pressing tool (81) at temperatures in the range of 160 to 230° C.;

compressing the obtained blank (90) into a molded part (10) with a second pressing tool (82) at temperatures in the range of 20 to 140° C.

According to a second aspect, the invention proposes a method for manufacturing a molded part, particularly a molded part of the proposed type, that features or comprises the steps of:

(a) providing a mat-shaped fibrous molding material;

(b) providing at least one polymer material or one or more polymer materials in the form of dispersions, powders, granulates or a film that consists of at least one layer;

(c) providing a first temperature-controlled pressing tool;

(d) providing a second pressing tool;

(e) applying the polymer materials or the at least one polymer material onto at least one surface of the fibrous molding material;

(f) compressing the fibrous molding material and the polymer materials or the at least one polymer material into a blank with the first pressing tool;

(g) compressing the blank obtained in step (f) into a molded part with the second pressing tool;

wherein:

the compression in step (f) takes place at temperatures in the range of 160 to 230° C.;

the compression in step (g) takes place at temperatures in the range of 20 to 140° C.

This proposed method makes it possible, for example, to manufacture the proposed molded parts.

According to an embodiment of the inventive molded part, it is proposed that the temperatures in step (f) lie in the range of 160 to 220° C. or in the range of 180 to 220° C.

According to an embodiment of the inventive molded part, it is proposed that the temperatures in step (g) lie in the range of 80 to 120° C. or in the range of 90 to 110° C.

According to an embodiment of the inventive molded part, it is proposed that a first, superficial coating zone is produced in step (f) of at least one of the polymer materials, wherein this first, superficial coating zone has a thickness D1 in the range of 10 to 200 µm or in the range of 10 to 60 µm or in the range of 10 to 30 µm.

According to an embodiment of the inventive molded part, it is also proposed that a second, non-positively connecting coating zone is produced in step (f) of at least one of the polymer materials and fibrous molding material, wherein this second, non-positively connecting coating zone has a thickness D2 in the range of 10 to 200 µm or in the range of 20 to 100 µm or in the range of 20 to 50 µm.

Due to the thicknesses of the two coating zones, this method makes it possible to precisely control the penetration depth of the second material into the fibrous molding material, as well as the adaptation of the first material to the surface of the fibrous molding material, by choosing the materials accordingly.

According to a third aspect, the invention proposes a method for manufacturing a molded part, particularly a molded part of the proposed type, that features or comprises the steps of:

(a) providing a mat-shaped fibrous molding material;

(b) providing at least one polymer material in the form of dispersions, powders, granulates or a film that consists of at least one layer;

(c) providing a first temperature-controlled pressing tool;

(d) providing a second pressing tool;

(e) applying the polymer materials onto at least one surface of the fibrous molding material;

(f) compressing the fibrous molding material and the polymer materials into a blank with the first pressing tool;

(g) compressing the blank obtained in step (f) into a molded part with the second pressing tool; wherein:

a first, superficial coating zone with a thickness D1 in the range of 10 to 200 µm is produced of at least one of the polymer materials in step (f);

a second, non-positively connecting coating zone with a thickness D2 in the range of 10 to 200 µm is produced of at least one of the polymer materials and fibrous molding material in step (f).

This proposed method makes it possible, for example, to manufacture the proposed molded parts.

Due to the thicknesses of the two coating zones, this proposed method furthermore makes it possible to precisely control the penetration depth of the second material into the fibrous molding material, as well as the adaptation of the first material to the surface of the fibrous molding material, by choosing the materials accordingly.

The compression in step (f) may take place at temperatures in the range of 160 to 230° C. or in the range of 160 to 220° C. or in the range of 90 to 110° C.

The compression in step (g) may take place at temperatures in the range of 20 to 140° C. or in the range of 80 to 120° C. or in the range of 90 to 110° C.

In each of the proposed methods:

a first polymer material may contain a thermoplastic matrix polymer with a first melting point;

a second polymer material may contain a thermoplastic matrix polymer with a second melting point;

the first melting point may be higher than the second melting point by more than 5° C. or by more than 10° C. or by more than 20° C. or by more than 30° C.

In each of the proposed methods:

a film that consists of a first film layer of the first polymer material and a second film layer of the second polymer material may be provided in step (b);

the film may be applied onto at least one surface of the fibrous molding material in step (e) in such a way that the second film layer faces the fibrous molding material.

According to an embodiment of the inventive method, it is proposed that a surface of the first coating zone that has a topography or unevenness of the surface height with a center line average height Ra in the range of 10 to 80 µm or in the range of 10 to 50 µm or in the range of 20 to 40 µm is produced in step (f) and/or in step (g).

According to an embodiment of the inventive method, it is proposed that:

the first pressing tool contacts the surface with a first pressing surface in step (f);

the second pressing tool contacts the surface with a second pressing surface in step (g);

at least one of the pressing surfaces is smoother than the topography of the surface and/or has a center line average height Ra of no more than 9 µm or no more than 7 µm or no more than 5 µm or no more than 3 µm or no more than 2 µm or no more than 1 µm or no more than 0.8 µm or no more than 0.7 µm or no more than 0.5 µm or no more than 0.4 µm or no more than 0.3 µm or no more than 0.2 µm or no more than 0.1 µm.

In each of the proposed methods, the molded part may be realized in the form of one of the proposed molded parts.

Advantageous enhancements of at least some embodiments of the inventive method are characterized in that:

the fibrous molding material and the at least one polymer material are compressed in step (f) at temperatures in the range of 160 to 220° C., preferably 180 to 220° C.;

the blank is compressed in step (g) at temperatures in the range of 80 to 120° C., preferably 90 to 110° C.;

the fibrous molding material and the at least one polymer material are compressed into a blank with a thickness of 1.5 to 4.0 mm, preferably 1.8 to 3.0 mm, in step (f);

the blank is compressed into a substrate with a thickness of 1.5 to 4.0 mm, preferably 1.6 to 3.0 mm, in step (g);

the fibrous molding material and the at least one polymer material are compressed into the blank in step (f) at pressures in the range of 0.26 to 0.80 kN/cm², preferably 0.28 to 0.60 kN/cm², particularly 0.28 to 0.55 kN/cm²;

the blank is compressed into the substrate in step (g) at pressures in the range of 0.05 to 0.25 kN/cm², preferably 0.05 to 0.20 kN/cm², particularly 0.08 to 0.12 kN/cm²;

the time interval between the conclusion of step (f) and the beginning of step (g) amounts to 0.5 to 30 s, preferably 1 to 10 s, particularly 1 to 5 s;

the first pressing tool is realized in the form of a roller press or flat press and a plane blank is produced in step (f); and/or the second pressing tool is realized in the form of a molding press and a laminar, three-dimensionally contoured substrate is obtained in step (g).

Due to the second pressing tool, the molded part may be shaped such that two points exist on the rear side of the molded part, wherein the tangent on the outer surface of the molded part is spaced apart from the connecting line between the two points on the rear side of the molded part by at least 2 cm.

The second pressing tool used in step (g) preferably is also temperature-controlled in order to allow an exact control of the temperature in step (g). This may be required if a narrow tolerance range should be realized for the center line average height Ra of the surface of the coating of the molded part and/or the substrate should be rapidly cooled in step (g).

In the inventive method, the fibrous molding material and the at least one polymer material may be compressed in step (f) at temperatures in the range of 160 to 220° C., preferably 180 to 220° C.

In the inventive method, the blank may furthermore be compressed in step (g) at temperatures in the range of 80 to 120° C., preferably in the range of 90 to 110° C.

In the inventive method, the fibrous molding material and the at least one polymer material may furthermore be compressed into a blank with a thickness of 1.5 to 4.0 mm, preferably 1.8 to 3.0 mm, in step (f).

In the inventive method, the blank may furthermore be compressed into a substrate with a thickness of 1.5 to 4.0 mm, preferably 1.6 to 3.0 mm, in step (g).

In the inventive method, the fibrous molding material and the at least one polymer material may furthermore be compressed into the blank in step (f) at pressures in the range of 0.26 to 0.80 kN/cm², preferably 0.28 to 0.60 kN/cm², particularly 0.28 to 0.55 kN/cm².

In the inventive method, the blank may furthermore be compressed into the substrate in step (g) at pressures in the range of 0.05 to 0.25 kN/cm², preferably 0.05 to 0.20 kN/cm², particularly 0.08 to 0.12 kN/cm².

In the inventive method, the time interval between the conclusion of step (f) and the beginning of step (g) may furthermore amount to 0.5 to 30 s, preferably 1 to 10 s, particularly 1 to 5 s.

In the inventive method, the first pressing tool may furthermore be realized in the form of a roller press or flat press and a plane blank may be produced in step (f).

In the inventive method, the second pressing tool may furthermore be realized in the form of a molding press and a laminar, three-dimensionally contoured substrate may be obtained in step (g).

In order to respectively lower the investment or system costs, it is possible to forgo a temperature control of the second pressing tool. In this variation of the method, the latent heat supplied to the blank by means of the first pressing tool in step (f) is utilized. For this purpose, the time interval between the conclusion of step (f) and the beginning of step (g) is chosen within the aforementioned limits such that the blank has at the beginning of step (g) a predefined temperature in the range of 20 to 140° C., preferably 80 to 120° C., particularly 90 to 110° C.

Temperature-controlled pressing tools are familiar to a person skilled in the art and respectively comprise, for example, plungers or mold cavities that are equipped with cooling channels, through which a heating or cooling fluid can be conveyed. If the second pressing tool used in step (g) is temperature-controlled, it can in the context of the invention also be utilized for cooling purposes. In this case, for example, water with a temperature of 15 to 25° C. is conveyed through the cooling channels.

It is preferred that the compression of the fibrous molding material and the at least one polymer material into a blank with the first pressing tool in step (f), as well as the compression of the blank with the second pressing tool in step (g), respectively takes place "at a distance" or "upon stop," wherein the clear gap of the first pressing tool, i.e. the distance between the surfaces of a first and a second plunger or the distance between a first and a second pressing roller, and independently thereof the clear gap of the second pressing tool, i.e. the distance between the surfaces of the first and second mold cavity, are respectively limited to a minimum value of 1.5 to 4.0 mm, particularly 1.6 to 3.0 mm. The compression "upon stop" is realized, for example, with the aid of spacers that are respectively arranged between the first and the second plunger or between the first and the second mold cavity. In this case, the pressure exerted upon the fibrous molding material and the at least one polymer material in step (f) and upon the blank in step (g) preferably assumes a value within the aforementioned limits.

In an alternative embodiment of the inventive method, steps (f) and (g) are respectively carried out in a pressure-controlled or force-controlled fashion. For this purpose, the respective pressure exerted by the first and the second pressing tool in steps (f) and (g) is limited to a maximum value within the aforementioned limits.

The method is preferably carried out in such a way that the dimension of the "stop" or the clear gap of the second pressing tool used in step (g) corresponds to 90 to 110%, preferably 95 to 105%, of the dimension of the "stop" or the clear gap of the first pressing tool used in step (f). Step (g) essentially serves for impressing the still hot and plastically deformable blank with a three-dimensional contour. The respective force or pressure required for this purpose is lower than the respective force or pressure required for compressing the fibrous molding material in step (f). Depending on the composition of the fibrous molding material, particularly the proportion of natural fibers, the blank produced in step (f) relaxes and slightly expands, if applicable, after the pressure is alleviated or after the conclusion of step (f). This expansion is taken into consideration in that the "stop" or clear gap of the second pressing tool used in step (g) is chosen slightly larger than the "stop" used in step (f). The dimension of the "stop" used for the second pressing tool in step (g) amounts, in particular, to 101 to 110%, preferably 101 to 105%, of the dimension of the "stop" used for the first pressing tool in step (f).

In case the blank reduces its volume as it cools after the completion of step (f) or after the removal from the first pressing tool, the dimension of the "stop" used for the second pressing tool in step (g) amounts to 90 to 99%, preferably 95 to 99%, of the dimension of the "stop" used for the first pressing tool in step (f).

The explanations of one of the aspects of the invention, particularly of individual characteristics of this aspect, also apply analogously to the other aspects of the invention.

BRIEF DESCRIPTION OF THE DRAWINGS

Designs and exemplary embodiments of the invention are described in greater detail below with reference to the attached drawings. However, the individual characteristics of this description are not limited to the individual designs and exemplary embodiments, but rather can be combined with other above-described individual characteristics and/or with individual characteristics of other designs and exemplary embodiments. The details in the drawings should merely be interpreted in a descriptive, but not in a restrictive sense. The reference symbols in the claims are not intended to restrict the scope of protection of the invention in any way, but rather merely refer to the embodiments illustrated in the drawings.

In these schematic drawings.

DETAILED DESCRIPTION

Figure 1:
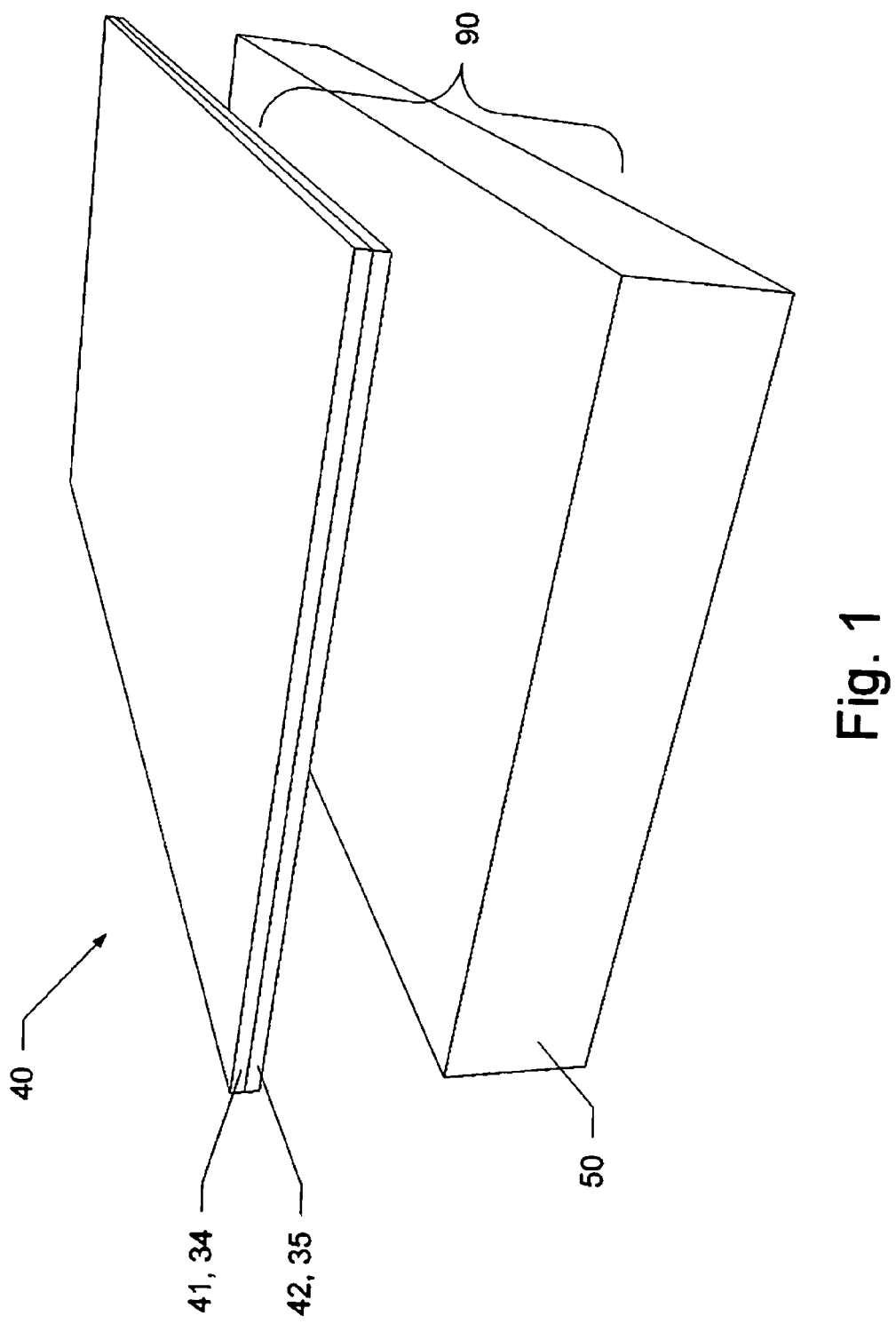
FIG. 1 shows a perspective representation of a blank for a molded part in the form of an exploded view.

FIG. 1 shows an exploded view of an advantageous embodiment of the invention, in which a fibrous molding material mat 50 is coated with a film 40 and hot-pressed in order to obtain a blank 90. The film 40 preferably comprises a first film layer 41 of a first polymer material 34 and a second film layer 42 of a second polymer material 35. According to the invention, a "polymer material" preferably is a material that referred to the overall weight of the respective polymer materials 34 or 35 contains more than 60 wt. %, preferably more than 80 wt. %, and, if applicable, up to 100 wt. % of a polymer or a mixture of two or more polymers. The at least one polymer—that is also referred to as matrix polymer below—preferably is a thermoplastic polymer. The matrix polymer is chosen, in particular, from the group comprising polyolefins, polyamide, polyethylene, polyvinyl chloride, polyester, polyacrylates, polypropylene, polyactides and/or mixtures thereof. It is particularly preferred that the matrix polymers of the materials 34 and 35 consist of polypropylene and/or propylene copolymers. In addition to the at least one matrix polymer, the polymer materials 34 and 35 may contain up to 40 wt. %, preferably up to 20 wt. %, of additives such as softeners, UV stabilizers, color pigments and fillers.

In a preferred enhancement of the invention, the material 34 contains a thermoplastic matrix polymer with a melting point that is higher than the melting point of the thermoplastic matrix polymer of the material 35 by more than 5° C., preferably by more than 10° C., particularly by more than 20° C., especially by more than 30° C.

The melting point of the respective matrix polymer of the materials 34 and 35 is determined by means of dynamic differential calorimetry (DDK or DSC for Differential Scanning calorimetry). The DSC method according to DIN 53765 and ISO 11357-3 is respectively familiar to a person skilled in the art of plastics processing and carried out, for example, with a calorimeter of the type "DSC 1" by Mettler-Toledo. In this case, two identical crucibles with a diameter of approximately 5 mm are arranged in a furnace chamber that can be homogenously heated. A weighed quantity of 10 to 20 mg of the polymer resin or the mixture of polymer resins to be analyzed is placed into one of the crucibles; the other crucible remains empty and serves as reference. The crucibles are arranged on holders that are equipped with highly sensitive temperature sensors. The DSC analysis comprises one or two cycles, in which the two crucibles and the sample to be analyzed are respectively heated from 0 to 220° C. and cooled again under a protective gas (for example nitrogen). According to DIN 53765-A-20, the heating and cooling processes take place uniformly with a rate of 20 Kelvin/min. During the two cycles, the difference between the temperatures of the two crucibles is respectively recorded as a function of the time or as a function of the furnace temperature. According to DIN 53765, the melting point corresponds to the center of the melting temperature range that is defined by a characteristic progression of the differential temperature (peak of the melting enthalpy).

According to FIG. 1, the film 40 is arranged on the fibrous molding material mat 50 in such a way that the second film layer 42 of the polymer material 35 containing the matrix polymer with the lower melting point faces the fibrous molding material mat 50. During the compression of the film 40 and the fibrous molding material mat 50 at a temperature of 160 to 230° C. in step (f) of the inventive method, the second film layer 42 is respectively molten or plasticized to a more significant degree than the first film layer 41. This promotes the penetration of the material 35 into the fibrous molding material mat 50. Due to its higher viscosity than the second film layer 42, the first film layer 41 does not penetrate into the fibrous molding material mat 50. The penetration depth of the material 35 into the fibrous molding material mat 50 and the adaptation of the first film layer 41 to the surface of the fibrous molding material mat 50 can be precisely controlled by choosing the matrix polymers of the materials 34 and 35 and the thicknesses of the first and the second film layers 41 and 42 accordingly.

The two-layer film 40 is preferably manufactured by coextruding the two materials 34 and 35 through a sheet die and has an overall thickness of 40 to 1000 μm, preferably 60 to 200 μm, particularly 80 to 120 μm. The ratio $V=F1/F2$ between the thickness F1 of the first film layer 41 and the thickness F2 of the second film layer 42 lies in the range of 0.1 to 5.0, preferably 0.1 to 0.9, particularly 0.1 to 0.5, especially 0.2 to 0.4.

Figure 2:
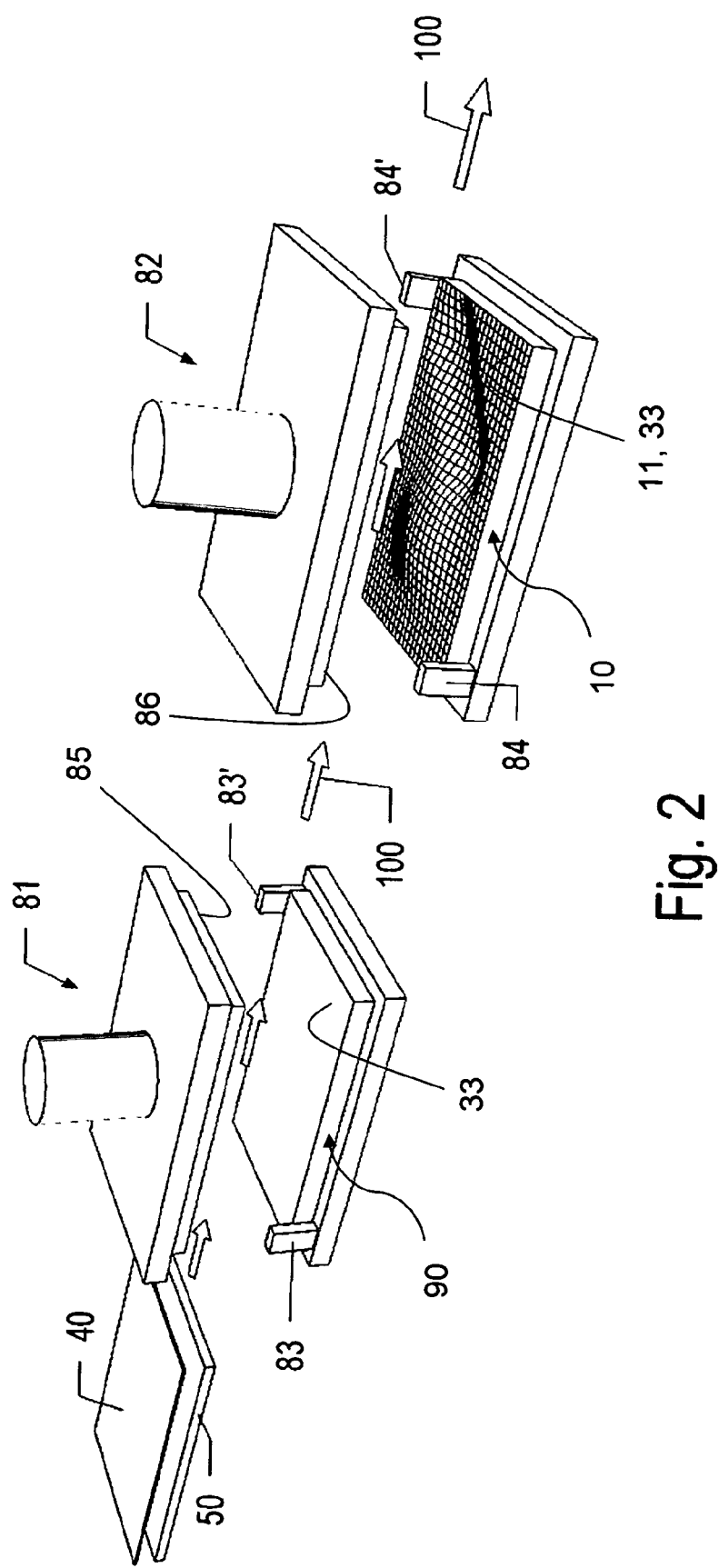
FIG. 2 shows a perspective representation of pressing tools.

FIG. 2 schematically shows the manufacture of the inventive molded parts 10. According to step (e) of the inventive method, one or more polymer materials 34, 35 are applied onto a fibrous molding material mat 50, for example, in the form of a single-layer or multi-layer film 40 and hot-pressed into a blank 90 in a first temperature-controlled pressing tool 81 in accordance with step (f) of the inventive method, wherein said blank is subsequently shaped into a three-dimensionally contoured molded part 10 featuring a substrate 20 of the hot-pressed fibrous molding material mat 50 and a coating 30 of the polymer materials 34, 35 in a second pressing tool 82 that is realized in the form of a molding press and, if applicable, temperature-controlled in accordance with step (g) of the inventive method. The arrows identified by the reference symbol 100 symbolize the production flow. The first pressing tool 81 and/or the second pressing tool 82 preferably is/are equipped with respective stops or spacers 83, 83' and 84, 84' that limit the minimum dimension of the clear gap of the respective pressing tool 81, 82 and therefore the respective minimum thickness of the blank 90 and the molded part 10.

The first pressing tool 81 preferably features a first pressing surface 85, by means of which it contacts a surface 33 of the coating 30 that faces away from the fibrous molding material mat 50 in step (f). In addition, the second pressing tool 82 features a second pressing surface 86, by means of which it contacts the surface 33 of the coating 30 in step (g). Both pressing surfaces 85, 86 have a center line average height Ra of no more than 0.4 μm. The surface 33 of the coating 30 simultaneously forms the surface 11 of the molded part 10 and has a topography with a center line average height Ra in the range of 10 to 80 μm. Consequently, both pressing surfaces 85, 86 are smoother than the topography of the surface 11, 33.

Figure 3:
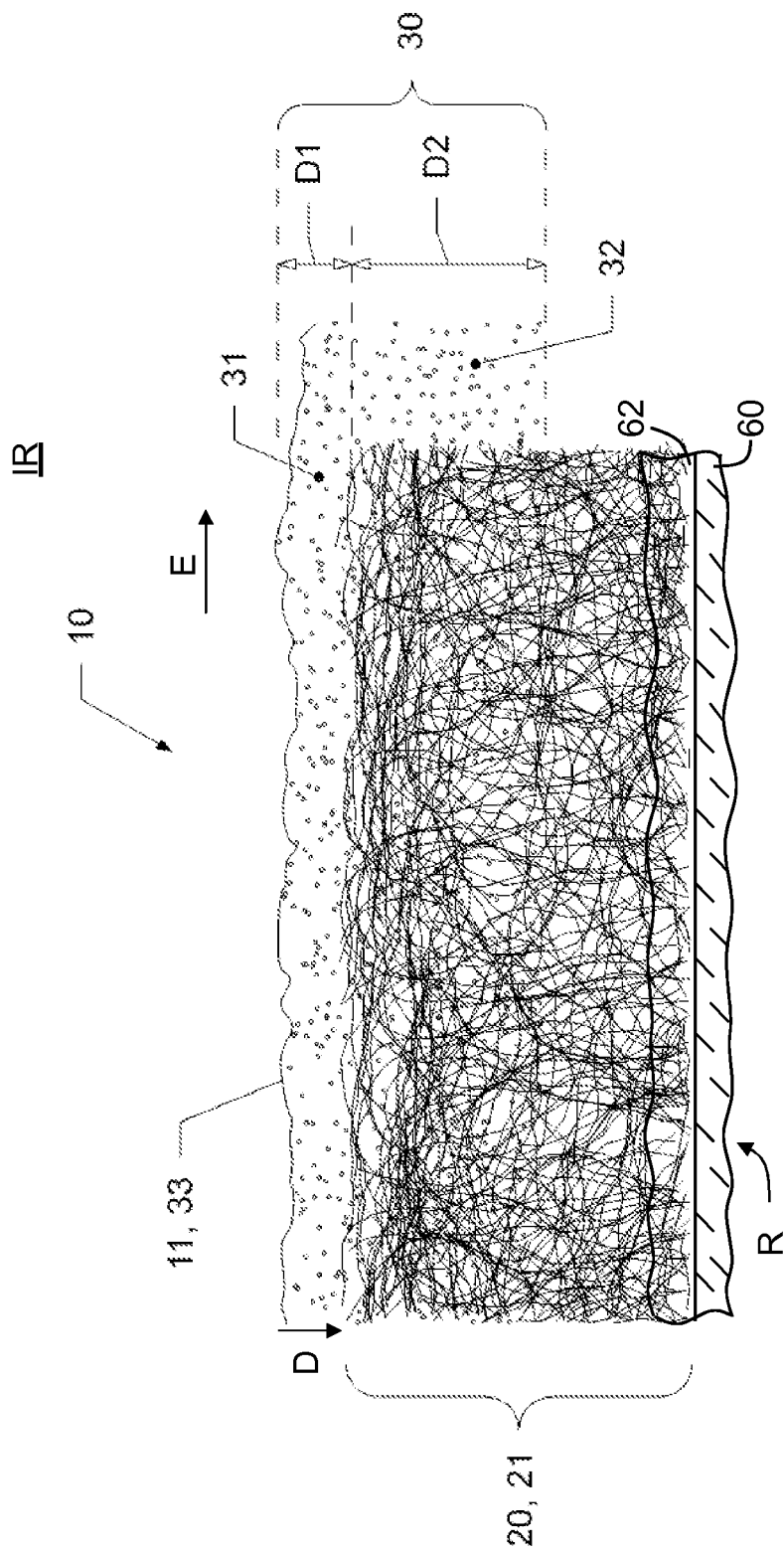
FIG. 3 shows a sectioned view of the surface of a molded part.

FIG. 3 shows a schematic sectioned view of a surface 11, 33 of a hot-pressed molded part 10 according to the invention with a substrate 20 of fibrous molding material 21 and a coating 30. The surface 11 of the molded part 10 is intended as the surface that forms the visible side of the molded part 10 and faces the interior IR once the molded part is installed as intended on a frame component such as, e.g., a body of a vehicle. The rear surface R lies opposite of the surface 11 and includes mounting part 60 and adhesive 62. The surface extends flat such that a direction, in which it extends, is indicated with an arrow E1 in the sectioned view. A thickness direction D of the molded part 10 is furthermore indicated in FIG. 3.

The coating or decorative layer 30 comprises a first coating zone 31 near the surface and a second coating zone 32 that is non-positively connected to the fibrous molding material 21. In this context, the term coating zone refers to a section of the thickness of the molded part 10 that extends transverse to the flat surface of the molded part in the thickness direction D (FIG. 3) of the molded part 10. The term first coating zone refers to an upper section of the thickness of the molded part 10, i.e. on the visible side 11, that consequently has an outer surface in the form of the surface 11 on the visible side and extends transverse thereto in the thickness direction D (FIG. 3) of the molded part 10.

The first or outer coating zone 31 is formed and, in particular, consists of one or more of the above-described polymer materials 34, 35 and is practically free of components of the fibrous molding material 21. The surface 33 of the first coating zone 31 simultaneously forms the surface 11 of the molded part 10 and has a topography that essentially conforms to the surface of the fibrous molding material 21. The topography of the surface 11, 33 is essentially defined by the shape and the more or less random arrangement of the fibers of the fibrous molding material 21 and characterized by a center line average height Ra in the range of 10 to 80 μm, preferably 10 to 50 μm, particularly 20 to 40 μm. The first coating zone 31 or its surface 33 respectively imparts the desired wood-like haptics and also acts as a seal that respectively protects the fibrous molding material 21 and the molded part 10 from damaging influences such as scratches or liquids.

The second coating zone 32 comprises a section, in which one or more of the above-described polymer materials 34, 35 have penetrated into the fibrous molding material 21. In addition to the materials 34, 35, the second coating zone 32 contains fibers and binder of the fibrous molding material 21. The second coating zone 32 therefore ensures a permanent non-positive anchoring of the coating 30 on the fibrous molding material 21 or on the substrate 20, respectively. In a preferred above-described embodiment of the invention, the binder of the fibrous molding material 21 consists of fibers of a thermoplastic polymer, particularly of polypropylene and/or propylene copolymers, that are plasticized and subsequently cooled in order to solidify into a matrix.

The first coating zone 31 has a thickness D1 of 10 to 200 μm, preferably 10 to 60 μm, particularly 10 to 30 μm.

Independently of the first coating zone 31, the second coating zone 32 has a thickness D2 of 10 to 200 μm, preferably 20 to 100 μm, particularly 20 to 50 μm.

The invention claimed is:

1. A molded part with a visible surface and a rear surface, with the molded part comprising:
   a substrate of hot-pressed fibrous molding material, wherein the hot-pressed fibrous molding material comprises fibers in a random arrangement; and
   a coating of at least one polymer material configured to adapt to a surface of the substrate of hot-pressed fibrous molding material;
   wherein a portion of the coating penetrates the substrate of hot-pressed fibrous molding material, wherein a surface of the coating is at least partially defined by the random arrangement and shape of the fibers of the fibrous molding material, and wherein, at least sectionally, a center line average height Ra of the surface of the coating is in the range of 10 to 80 μm.

2. The molded part according to claim 1, wherein the surface of the coating has at least sectionally a center line average height Ra in the range of 20 to 80 μm.

3. The molded part according to claim 1, wherein the coating features a first coating zone and a second coating zone which extends into the substrate in a thickness direction.

4. The molded part according to claim 3, wherein
   the first coating zone contains at least one of the polymer materials and has a thickness D1 in the range of 10 to 200 μm or in the range of 10 to 60 μm or in the range of 10 to 30 μm; and
   the second coating zone contains at least one of the polymer materials and fibrous molding material and has a thickness D2 in the range of 10 to 200 μm or in the range of 20 to 100 μm or in the range of 20 to 50 μm; wherein the center line average height Ra imparts wood-like haptics.

5. The molded part according to claim 1, wherein:
   a first polymer material of the at least one polymer material contains a thermoplastic matrix polymer with a first melting point;
   a second polymer material of the at least one polymer material contains a thermoplastic matrix polymer with a second melting point; and
   the first melting point is higher than the second melting point by more than 5° C. or by more than 10° C. or by more than 20° C. or by more than 30° C.

6. The molded part according to claim 1, wherein:
   the substrate is coated with a film that contains a first film layer of a first polymer material, wherein the first film layer at least partially forms a first coating zone of the coating, and a second film layer of a second polymer material, wherein the second film layer at least partially forms a second coating zone of the coating which extends into the substrate in a thickness direction.

7. The molded part according to claim 1, wherein the substrate is coated with a film of the at least one of the polymer material forming the coating of the molded part, wherein the film contains at least one layer and has an overall thickness in the range of 40 to 1000 μm.

8. The molded part according to claim 1, wherein:
each of the polymer materials contains a matrix polymer and, if applicable, additives such as color pigments and UV stabilizers; and
the matrix polymer is chosen from polyolefins, polyester, polypropylene, polyamide or mixtures thereof and the proportion of additives referred to the polymer material amounts to 0 to 15 wt. %.

9. The molded part according to claim 1, furthermore featuring at least one mounting part of plastic and/or a metallic material such as sheet steel that is non-positively connected to the substrate, wherein particularly the mounting parts are connected to the substrate by means of retaining elements such as pins, screws or clips or by means of interlacing, clawing or clamping or by means of adhesives.

10. A method for manufacturing a molded part, with the method comprising the steps of:
applying polymer materials onto at least one surface of a fibrous molding material in the form of dispersions, powders, granulates or a film that consists of at least one layer, wherein the polymer material is configured to adapt to the at least one surface of the fibrous molding material, wherein the fibrous molding material comprises fibers in a random arrangement;
compressing the fibrous molding material and the polymer materials into a blank with a first temperature-controlled pressing tool at temperatures in the range of 160 to 230° C.; and
compressing the obtained blank into a molded part with a second pressing tool at temperatures in the range of 20 to 140° C. to form a substrate of hot-pressed fibrous molding material with a coating comprising polymer materials, wherein a portion of the coating penetrates the substrate of hot-pressed fibrous molding material, wherein a surface of the coating is at least partially defined by the random arrangement and shape of the fibers of the fibrous molding material, and wherein, at least sectionally, a center line average height Ra of the surface of the coating is in the range of 10 to 80 μm.

11. The method according to claim 10, wherein the temperatures lie in the range of 160 to 220° C. during the compression into the blank.

12. The method according to claim 10, wherein the temperatures lie in the range of 80 to 120° C. during the step of compressing the obtained blank.

13. The method according to claim 10, wherein:
a first coating zone is produced during the compression into the blank of at least one of the polymer materials, wherein this first coating zone has a thickness D1 in the range of 10 to 200 μm or in the range of 10 to 60 μm; and
a second coating zone is produced during the compression into the blank of at least one of the polymer materials and fibrous molding material, wherein this second coating zone has a thickness D2 in the range of 10 to 200 μm or in the range of 20 to 100 μm which extends into the substrate in a thickness direction.

14. A method for manufacturing a molded part, with the method comprising the steps of:
(a) providing a mat-shaped fibrous molding material, wherein the fibrous molding material comprises fibers in a random arrangement;
(b) providing at least one polymer material in the form of dispersions, powders, granulates or a film that consists of at least one layer, wherein the polymer material is configured to adapt to at least one surface of the mat-shaped fibrous molding material;
(c) providing a first temperature-controlled pressing tool;
(d) providing a second pressing tool;
(e) applying the polymer materials onto the at least one surface of the fibrous molding material;
(f) compressing the fibrous molding material and the polymer materials into a blank with the first pressing tool; and
(g) compressing the blank obtained in step (f) into a molded part having a substrate of hot-pressed fibrous molding material and a coating comprising the at least one polymer material with the second pressing tool;
wherein:
a first coating zone with a thickness D1 in the range of 10 to 200 μm is produced of at least one of the polymer materials in step (f);
a second coating zone which extends into the substrate in a thickness direction is produced, the second coating zone having a thickness D2 in the range of 10 to 200 μm and being produced of at least one of the polymer materials and fibrous molding material in step (f); and
a surface of the coating is at least partially defined by the random arrangement and shape of the fibers of the fibrous molding material, and wherein, at least sectionally, a center line average height Ra of the surface of the coating is in the range of 10 to 80 μm.

15. The method according to claim 14, wherein the compression in step (f) takes place at temperatures in the range of 160 to 230° C.

16. The method according to claim 14, wherein the compression in step (g) takes place at temperatures in the range of 20 to 140° C.

17. The method according to claim 16, wherein:
a first polymer material contains a thermoplastic matrix polymer with a first melting point;
a second polymer material contains a thermoplastic matrix polymer with a second melting point; and
the first melting point is higher than the second melting point by more than 5° C. or by more than 10° C. or by more than 20° C. or by more than 30° C.

18. The method according to claim 17, wherein:
a film containing a first film layer of the first polymer material and a second film layer of the second polymer material is made available in step (b); and
the film is applied onto at least one surface of the fibrous molding material in step (e) in such a way that the second film layer faces the fibrous molding material.

19. The method according to claim 14, wherein:
the first pressing tool contacts the surface with a first pressing surface during the compression into the blank;
the second pressing tool contacts the surface with a second pressing surface during the compression into the molded part; and
at least one of the pressing surfaces is smoother than the topography of the surface and/or has a center line average height Ra of no more than 9 μm.

* * * * *